US006460481B1

(12) United States Patent
Young

(10) Patent No.: US 6,460,481 B1
(45) Date of Patent: Oct. 8, 2002

(54) CAKE DECORATOR HAVING A POWER DRIVE

(75) Inventor: Christopher Young, South Kent, CT (US)

(73) Assignee: Innovative Injectors, Inc., New Milford, CT (US)

( * ) Notice: Subject to any disclaimer, the term of this patent is extended or adjusted under 35 U.S.C. 154(b) by 0 days.

(21) Appl. No.: 09/398,284

(22) Filed: Sep. 20, 1999

Related U.S. Application Data
(60) Provisional application No. 60/105,544, filed on Oct. 26, 1998.

(51) Int. Cl.[7] ................................................. A23G 3/20
(52) U.S. Cl. ......................... 118/14; 118/24; 118/300; 222/262; 222/263; 222/324; 222/327; 222/333; 222/383.1; 99/345; 99/532
(58) Field of Search ............................. 118/14, 24, 300; 222/262, 263, 324, 327, 333, 383.1, 389; 99/345, 532; 426/115, 516

(56) References Cited

U.S. PATENT DOCUMENTS

| 6,026,985 A | * | 2/2000 | Elliott, Sr. ................... 222/1 |
| 6,041,977 A | * | 3/2000 | Lisi ........................... 222/389 |
| 6,047,858 A | * | 4/2000 | Romer ......................... 222/1 |
| 6,101,968 A | * | 8/2000 | Fitzgibbons et al. .......... 118/14 |
| 6,152,333 A | * | 11/2000 | Binder ....................... 222/333 |

FOREIGN PATENT DOCUMENTS

JP          62-179348       *    8/1987

* cited by examiner

Primary Examiner—Laura Edwards
(74) Attorney, Agent, or Firm—Dallett Hoopes

(57) ABSTRACT

This cake decorator has an axial cylinder and a powered piston controlled by twisting an axial rotary actuator switch in one direction or another.

6 Claims, 8 Drawing Sheets

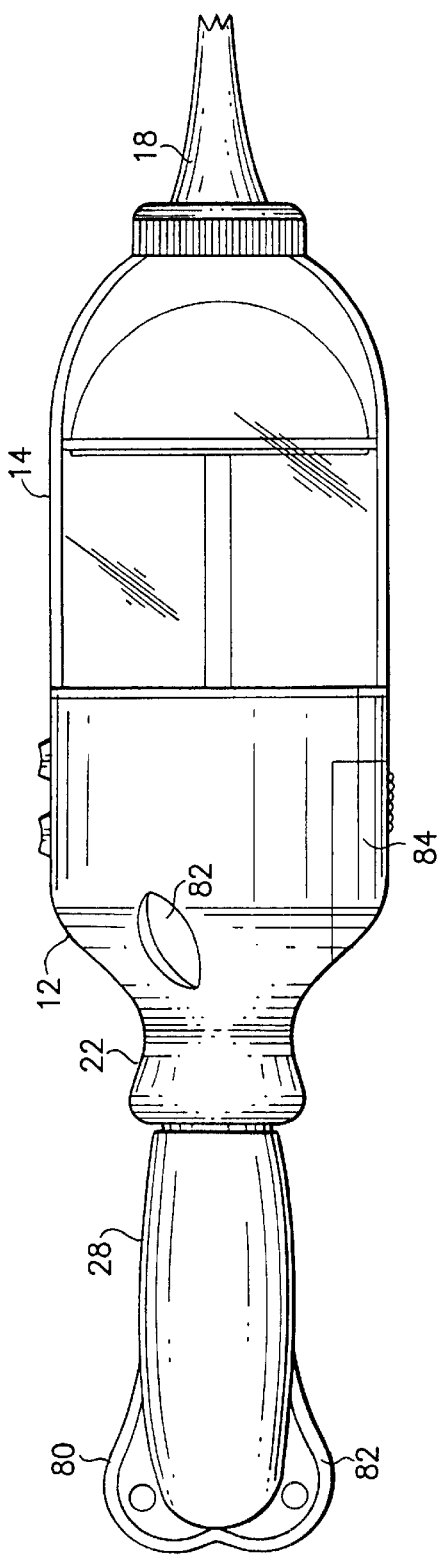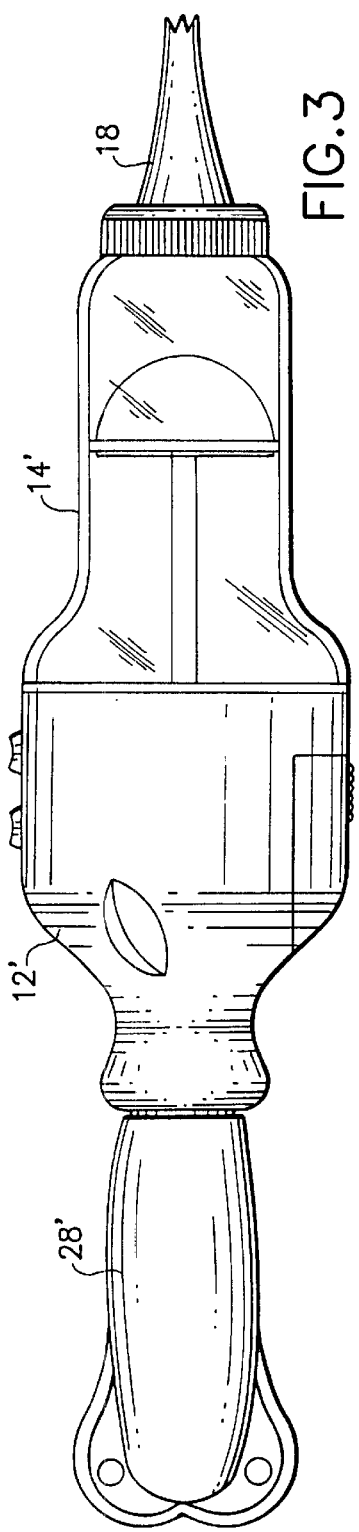

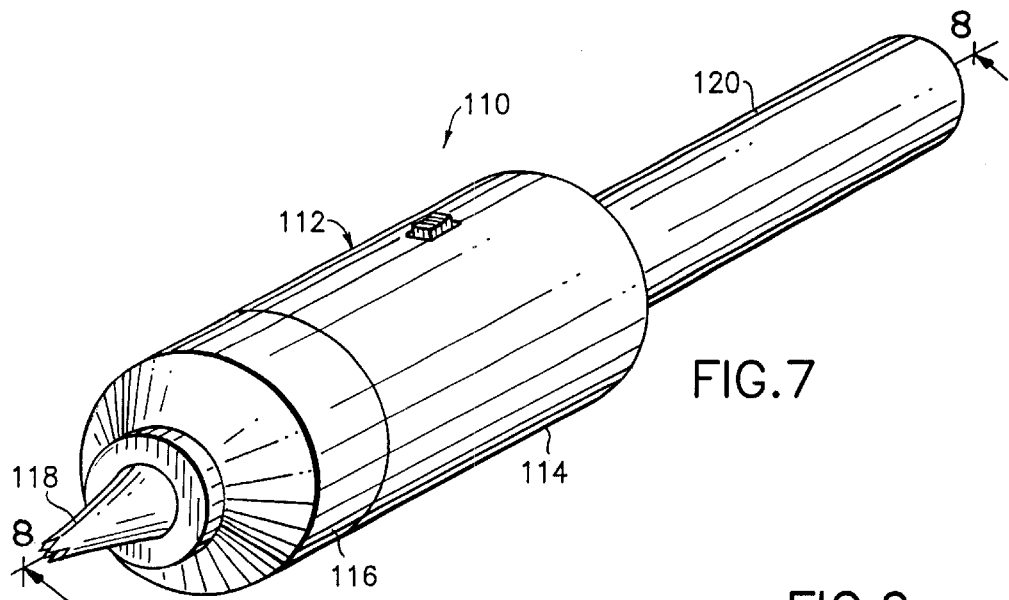
FIG.7
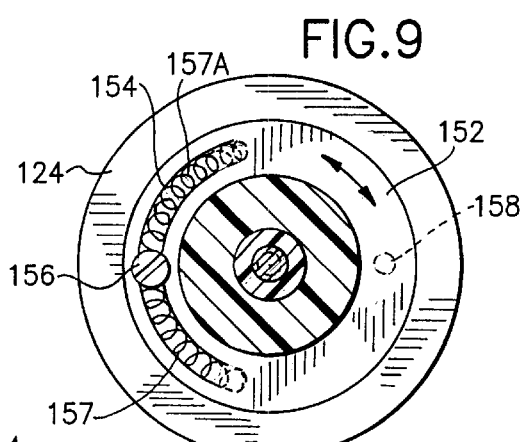
FIG.9
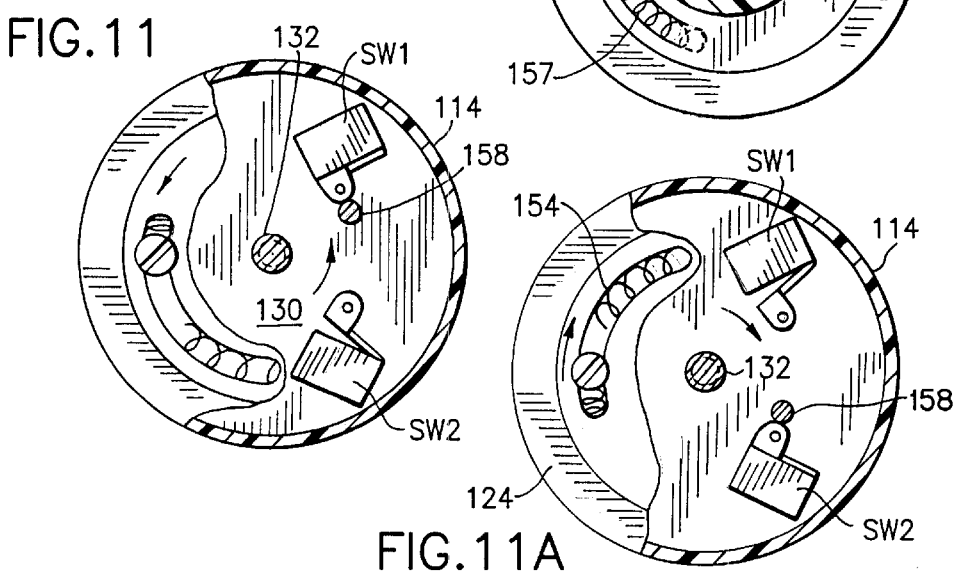
FIG.11
FIG.11A

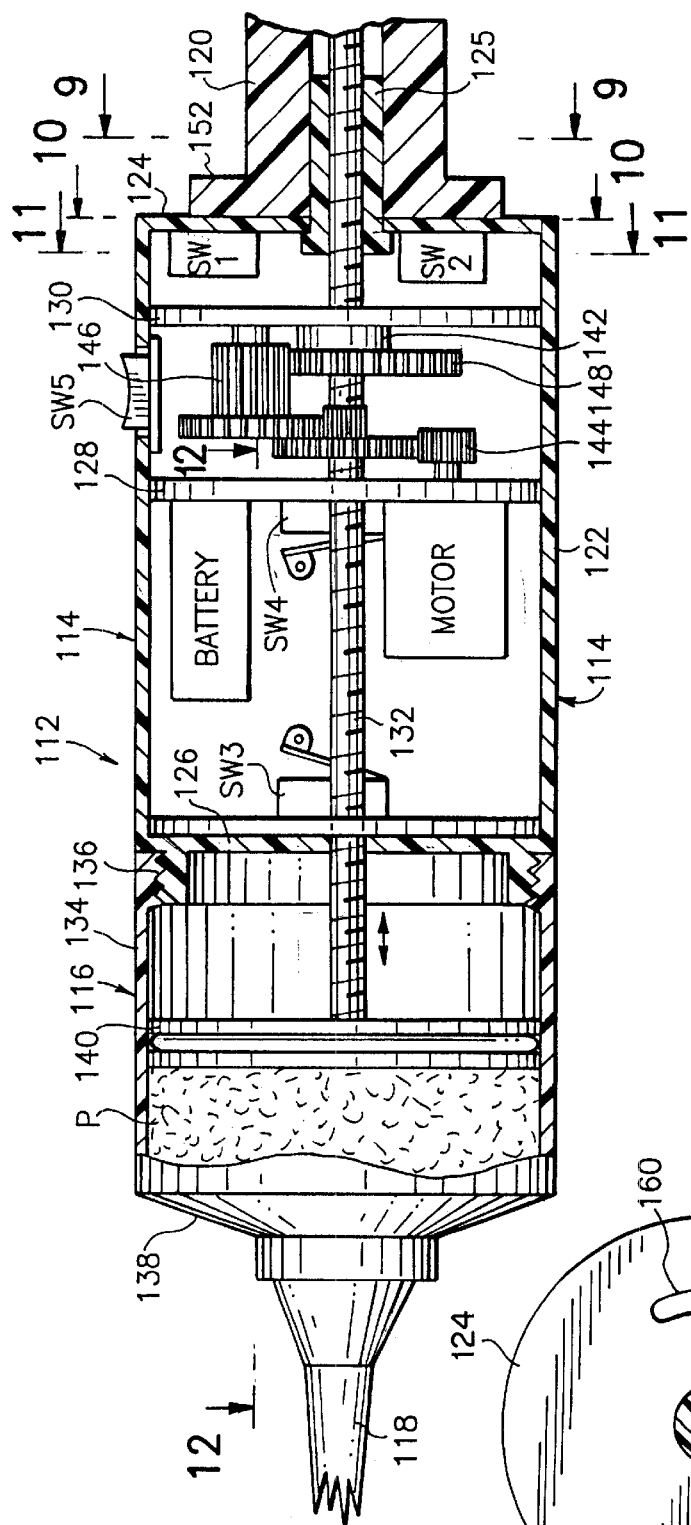

CAKE DECORATOR HAVING A POWER DRIVE

CROSS-REFERENCE TO RELATED APPLICATION

This application is. related to Provisional patent application Ser. No. 60/105,544 filed Oct. 26, 1998.

FIELD OF THE INVENTION

This invention relates to a cake decorator having a power drive. More specifically, this invention relates to such a cake decorator in which the power is activated by manipulating a switch handle in the same kind of twisting motion in which decorator pastry has been traditionally extruded from a fabric cake decorator bag.

BACKGROUND OF THE INVENTION

The need for a powered cake decorator should be apparent to those in the business who for long periods are required to twist the usual pastry bag to compress the fluid inside and extrude it out the nozzle. Home cooks and pastry chefs have objected to earlier powered decorators in that the operation has been awkward and unnatural. There has been a need for a powered cake decorator in which the activation of the power is by a more natural twisting action such as has been used in performing the job manually by gripping the nozzle with one hand and twisting the bag with the other.

SUMMARY OF THE INVENTION

It is an object of this invention to provide a decorator having the aforesaid action.

The invention is a cake decorator comprising a housing including reservoir cylinder and piston and power section. The piston is mounted on a threaded rod extending rearwardly and operatively engaging a gear wheel or nut mounted for rotation in the power section. The gear wheel has a central threaded opening operatively engaging the threaded rod. The gear wheel is connected through a gear train to a small electric motor whereby the motor can drive the gear wheel to propel the rod and piston forward or rearward of the cylinder. The cylinder terminates at its forward end in the usual decorator nozzle.

Mounted for limited rotation at the rear of the housing is a handle, and spring means biases the handle in a neutral rotary position. An offset pin on the handle extending inside the housing engages selectively micro-switches to connect the motor to a battery also in the housing to drive the piston in one direction or the other depending on in which direction the handle is twisted.

BRIEF DESCRIPTION OF THE DRAWINGS

Further objects and features of the invention will be clear to those skilled in the art from a review of the following specification and drawings, all of which present a non-limiting form of the invention. In the drawings:

FIG. 2 is a side elevational view;

FIG. 3 is a side elevational view of a modified form of decorator;

FIG. 7 is a perspective view of a second embodiment of a decorator embodying the invention;

FIG. 8 is an enlarged fragmentary sectional view of the second embodiment;

FIG. 9 is a sectional view taken on the line 9—9 of FIG. 8;

FIG. 10 is a sectional view taken on the line 10—10 of FIG. 8;

FIGS. 11 and 11A are sectional views taken on the line 11—11 of FIG. 8 with part moved rightward to the plane of FIG. 9 to show the correlation of the activating pin and the biasing means in two different positions.

DESCRIPTION OF A FIRST EMBODIMENT

Figure 1:
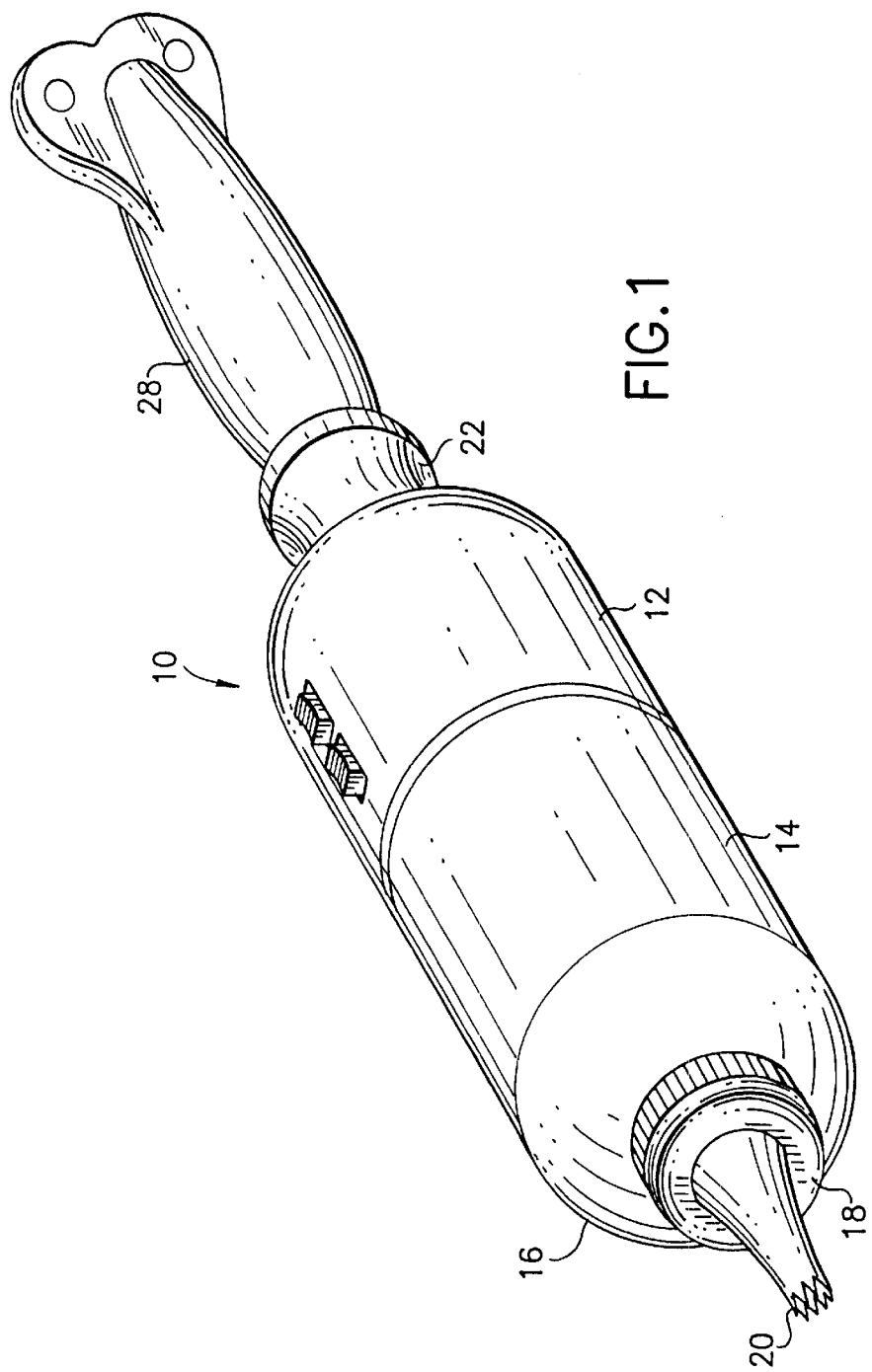
FIG. 1 is a perspective view of a cake decorator embodying the invention.
Figure 4:
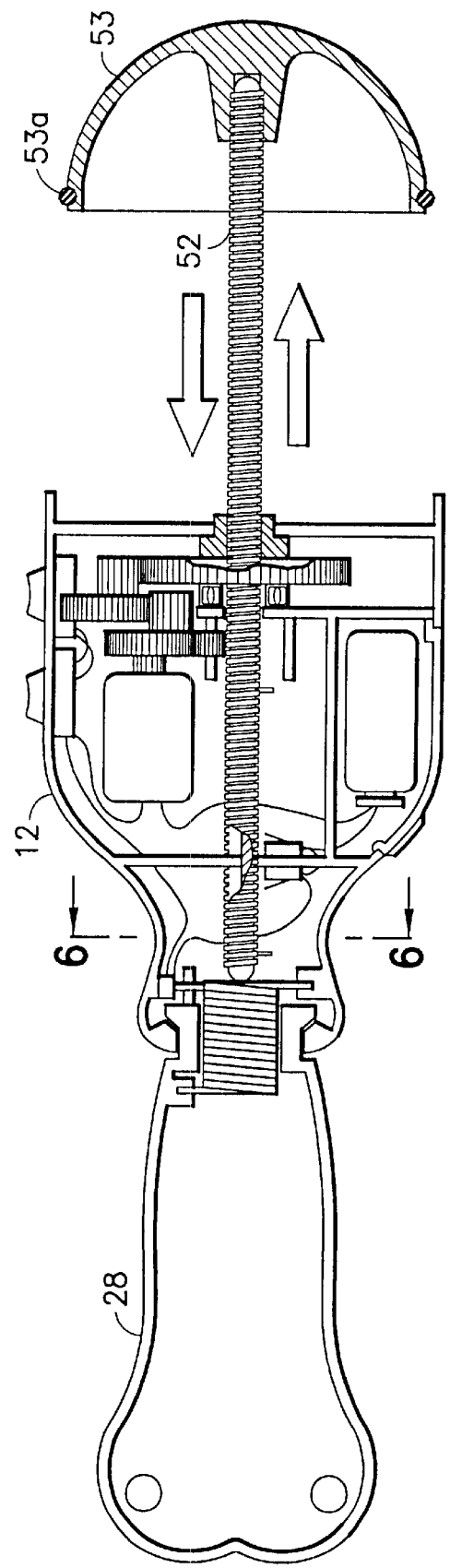
FIG. 4 is a sectional view taken on the center line of the decorator of FIG. 2 with the cylinder removed.

A cake decorator embodying the invention is shown in FIG. 1 and generally designated 10. It comprises a housing 12 to the front of which is secured a removable preferably transparent cylinder 14. The front end of the cylinder is reduced in a hemispherical shape 16 and provided with an opening (not shown) over which the usual cake decorator nozzle 18 is screwed. The nozzle 18 has the usual castellated opening 20.

Figure 5:
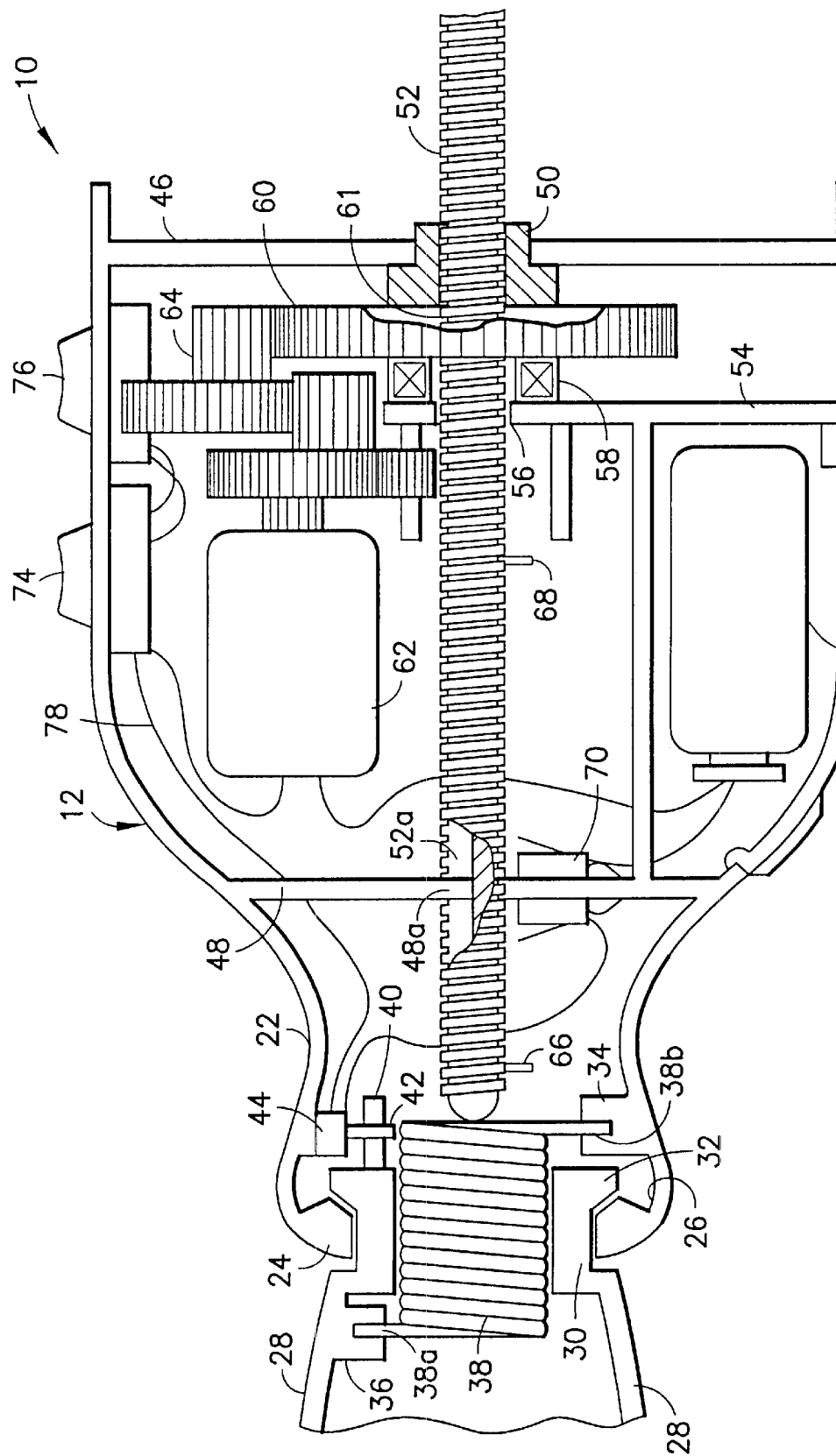
FIG. 5 is an enlarged portion of FIG. 4.
Figure 6A:
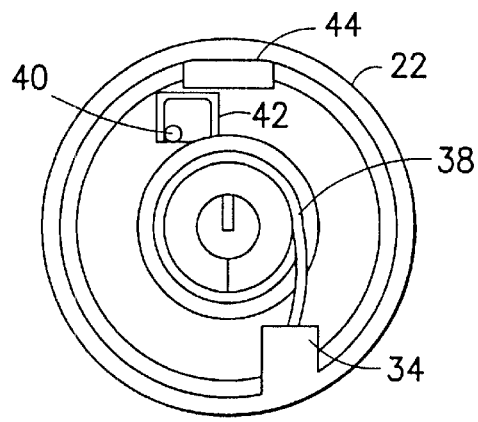
FIGS. 6A, B & C are sectional views taken on the line 6—6 of FIG. 4 and showing the operation of the switch by the handle pin.
Figure 6B:
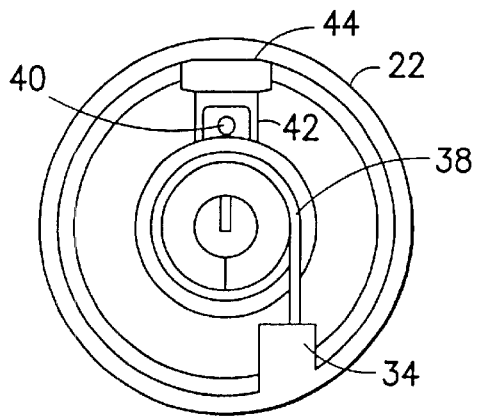
Figure 6C:
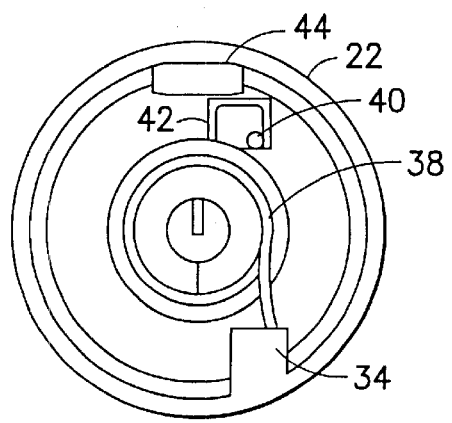

The rear of the housing 12 has a neck 22. The neck 22 has a central rearward opening 24 with an annular recess 26 (FIG. 5) thereinside. A hollow handle 28 is provided and has a circumferentially reduced portion 30 by which the handle is journaled inside the rim of the opening 24. Forward of the circumferentially reduced portion 30 the handle has an outward annular flange 32 which keeps the handle rotatably connected to the housing 12.

The interior of the housing 12 is formed with an inward radial boss 34 and the handle is formed with an inward projection 36. An axial spring 38 is disposed axially in the forward end of the hollow handle and the two ends of the spring 38, 38a and 38b, are trapped in bores on the boss 34 and the projection 36 respectively, urging the handle toward a neutral position with respect to the housing. A pin 40 offset from the axis extends forward from the forward end of the handle and is flanked by the legs of a U-shaped actuator 42 of a three-position micro-switch 44 mounted inside the housing.

Forward of the spring 38 the housing 12 is provided with radial partitions 46 and 48. The more forward partition 46 is formed with an opening in which sits a flanged bushing 50 which may be of a durable plastic such as Nylon. A threaded drive shaft 52 rides in the bushing. The shaft is formed with a longitudinal keyway 52a (FIG. 5), and a tongue 48a of partition 48 extends into the keyway and locks the shaft from rotating. Rearward of the bushing is an additional partial partition 54 formed with an opening 56 for the shaft. The opening is surrounded on its forward side by a bearing 58, and a gear wheel 60 having a threaded opening 61 is operatively disposed on the threaded rod 52 and butts against the bearing.

At the forward end of the shaft 52 is a piston 53 disposed in the reservoir section. It may be dome-shaped as shown. An O-ring 53a is mounted in an annular groove at the extreme outward end of the piston. This assures a sealing relationship with the inside of the reservoir cylinder 14.

An electric motor 62 is disposed in the housing and supported by means not shown. Its shaft is part of a gear train 64 engaging the gear wheel so that as the motor 62 is active, it drives the gear wheel 60 at a reduced rate. Limit pins 66 and 68 are radially disposed spaced along the drive shaft and a micro-limit switch 70 is mounted on partition 48 with opposite actuator arms in the path of the pins 66 and 68 respectively.

A dry cell battery 72, which may be rechargeable, is also disposed in the housing 12 and mounted by means not shown. Slide switches or rocker switches are mounted on the housing for additional controls. Specifically, an on/off switch 74 is mounted rearward and a forward reverse switch 76 is mounted forward in alignment with the on/off switch.

The battery, motor, switch 44 and switches 74, 76 are connected in circuitry as shown by appropriate conductors 78. The circuitry is such that when either of the pins 66 or 68 engage either of the respective actuators of switch 70, the motor is cut off. Otherwise the switch 44 controls the direction and on/off of the motor 60 depending on the rotary position of the handle 28.

Further, the switch 74 is an absolute cut off switch to avoid the inadvertent actuation of the motor. Finally, the switch 76 may reverse the direction of the motor depending on which direction of twisting the handle 28 is most comfortable for the operator.

FIG. 3 shows a modification in which the cylinder 14 is reduced in diameter to effect the discharge of smaller batches of icing or dispensing at a reduced rate for a given movement of the piston.

As shown in FIG. 2, the housing 12 and handle 28 may be formed with projections 80, 82 to facilitate gripping of the device in operation. A door 84 may be provided in the housing 12 for battery replacement.

In use, the reservoir cylinder 14 is unscrewed from the housing 12 and filled with the selected icing or other fluid paste. With the piston retracted, the cylinder is reinstalled on the housing. Thereafter, the reservoir cylinder and housing 12 are gripped with one hand and the handle 28 with the other hand. The handle is twisted relative to the housing in much the same way that a pastry bag is twisted in normal use. To reverse the travel of the piston, the handle may be rotated in the opposite direction or the reversal switch 76 may be thrown and the handle twisted in the same direction.

Second Embodiment

Figure 12:
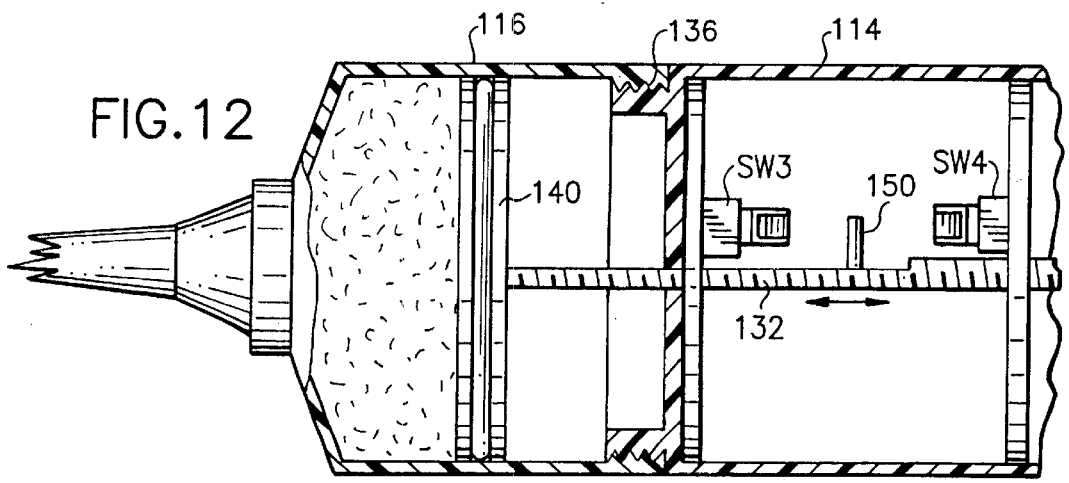
FIGS. 12, 12A and 12B show different positions of the piston and drive rod of the second embodiment and the cooperation of the travel limit pin and the respective limit switches.
Figure 12A:
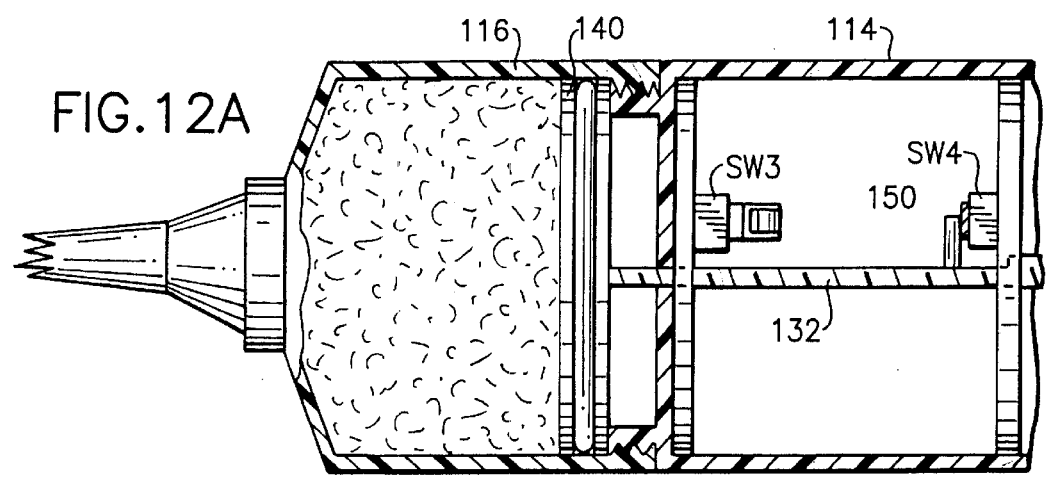
Figure 12B:
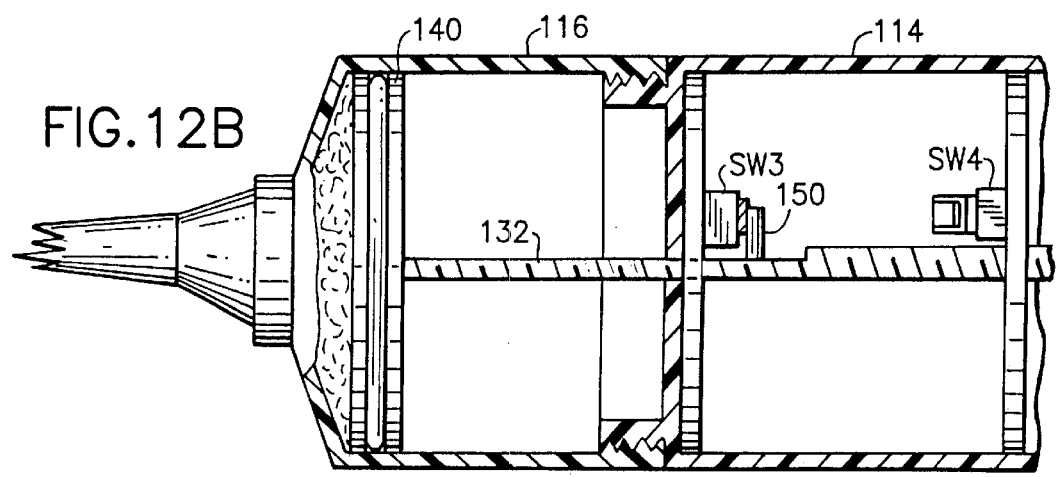

A second embodiment of the invention is shown in FIG. 7 and generally designated 110. It comprises a housing 112 including a drive section 114 and a reservoir section 116. The reservoir section has a discharge nozzle 118 fitted over a central opening in the end thereof. A rotary actuator 120 is journaled in the rear end of the drive section (FIG. 3). The drive section is defined by a cylindrical side wall 122, a rear end wall 124 onto which the actuator 120 is held in place by the central plastic bushing 125; a front wall 126 and first and second intermediate walls 128, 130. The walls 126, 128, 130 and 124 are centrally apertured to receive a threaded rod or screw 132 having a flattened portion (FIG. 12) which extends longitudinally of tne drive section and out the front wall 126. The opening in the wall 126 is shaped to engage the flattened portion of the screw 132 to prevent its rotating as in the other embodiments. The reservoir section 116 comprises the cylindrical side wall 134, the rearward end of which (FIG. 8) is operatively attached to section 114 by thread means 136. The leftward end of the reservoir section is defined by the tapered front wall 138 receiving the nozzle 118. Inside the reservoir section 116 the shaft 132 on its end is provided with a piston 140 sealed to the inside of the reservoir section as shown.

The intermediate wall 130 rotatably journals, by means not shown, a central nut 142. A motor as shown in FIG. 8 is secured to the apertured intermediate wall 128 through which extends a drive pinion 144. The pinion engages a reduction gear train 146 which drives a spur gear 148 secured to the nut 142. By this arrangement, the motor can drive through reducing means the nut 142 to drive the shaft 132 inward or outward longitudinally of the housing 112. A battery for the motor is provided as shown and connected to the motor by circuit means not shown.

The end wall 126 and the intermediate wall 128 are provided with switches SW3 and SW4 respectively. The switches carry actuator arms as shown which are engaged by a pin 150 to limit the movement of the shaft in one direction or the other.

Turning now to an essential of the invention, the rotary actuator 120 and boss 125 have a central opening to receive the end of the shaft 132. The actuator is formed with an outward annular flange 152 and the flange is formed with an arcuate slot 154 (FIG. 9). The slot receives coil springs 157 and 157a are disposed between the ends of the slot respectively and a central bolt 156 also in the slot 154 and secured to the wall 124. From the inside surface of the flange 152 a pin 158 extends inward through an arcuate window 160 (FIG. 10) in the wall 124. The pin 158 moves with the actuator in the arcuate window 160.

Internally of the housing the end wall 124 is provided with switches SW1 and SW2. These switches have actuator arms (FIGS. 11, 11a) which are engaged selectively by the pin 158 as the actuator 120 is rotated through the arcuate travel defined by the window 160.

Switches SW1 and SW2 are connected in the circuit means in configuration which will be apparent to those skilled in the art. Additionally, a reversal switch SW5 is provided and accessible from the outside of the housing 112.

The operation of the cake decorator of the invention should be apparent to those skilled in the art from the above description. The commencement of how the reservoir section 116 is removed from the threaded means 136 and filled with the decorating paste P or the like as desired. With the piston 140 retracted, the reservoir section is reinstalled on the threaded means 136. To activate the battery, the user grasps the housing 112 with one hand and grasps the actuator 120 with the other hand, twisting the actuator in the appropriate direction to drive the motor to advance the piston, forcing some paste out the open end of the nozzle 118. When the pin 150 engages, the actuator of switches SW3, the motor is de-energized. By twisting the actuator 120 in the opposite direction, the pin 158 will eventually engage the actuator of switch SW4, reverse the motor and cause the piston 140 to retract, preparatory to refilling the reservoir section 116. When the pin 150 engages the actuator of switch SW3, the motor is again de-energized. At this point the reservoir section 116 can be removed and filled again. The direction in which the actuator 120 is turned may be more convenient and natural as selected to suit. For instance, as with twisting the fabric pastry bag, the user may prefer to twist the handle in clockwise direction and, hence, would be more comfortable in twisting the actuator 120 in that direction. By the same token, it may be more natural for a left-handed person to twist counter-clockwise to extrude the paste. The direction of rotation in which the actuator 120 is turned to effect the advance of the piston 140 can be reversed completely by switch SW5. All of the switches, including SW5, fit into circuit means in ways which will be apparent to those skilled in the art.

Variations in the invention are possible. Thus, while the invention has been shown in limited numbers of embodiments, it is not so limited but is of a scope defined by the following claim language which may be broadened by an extension of the right to exclude others from making, using or selling the invention as is appropriate under the doctrine of equivalents.

What is claimed is:

1. A cake decorator comprising:

a. a housing including a drive section and a reservoir section for supplying a decorating pastry, the sections being releasably joined together, the reservoir section comprising a cup-shaped cylinder having a central discharge nozzle at one end of the housing, the drive section including a piston fitting snugly inside the cylinder of the reservoir section, b. power means in the drive section comprising a screw mounted for reciprocation axially of the housing and mounting the piston on an end closer to the nozzle, a radial wall in the drive section, a nut rotatably mounted in the wall and operatively engaging the screw, a power supply, a bi-directional motor in the housing and a gear train drivingly linking the motor and nut, and switch means and circuit means for the motor, power supply and switch means, and c. an actuator disposed axially of the housing and journaled to the housing for rotation at the opposite end of the housing from the nozzle, the actuator selectively engaging a portion of the switch means to energize the motor in one direction or another depending on the direction in which the actuator is manually turned relative to the housing.

2. A cake decorator as claimed in claim 1 further comprising spring means bias the actuator relative to the housing toward a position intermediate opposite ends of its rotary travel.

3. A cake decorator as claimed in claim 1 wherein the actuator further comprises a pin offset from the axis of the actuator and the pin selectively engaging one portion of the switch means for energizing the motor in one direction or the other.

4. A cake decorator as claimed in claim 3 wherein the circuit means includes a switch to reverse connections between motor and power supply to effect reversal of direction of rotation, the motor vis-a-vis direction of rotation of the actuator.

5. A cake decorator as claimed in claim 4 wherein the drive section and the reservoir section are releasably joined together by threaded means.

6. A cake decorator as claimed in claim 1 wherein the housing is provided with limit switches comprising part of the switch means and the screw is provided with a pin rigid with the screw, the pin engaging and actuating the limit switches at the respective ends of travel of the screw.

* * * * *